United States Patent [19]

Beck et al.

[11] Patent Number: 4,897,307

[45] Date of Patent: Jan. 30, 1990

[54] PROCESS FOR THE SOLVENT-INDUCED CRYSTALLIZATION OF AMORPHOUS POLY(ETHERETHERKETONE)-TYPE POLYMERS AND THE ARTICLE FORMED THEREBY

[75] Inventors: Henry N. Beck, Walnut Creek, Calif.; Robert M. Nowak, Midland, Mich.

[73] Assignee: The Dow Chemical Company, Midland, Mich.

[21] Appl. No.: 84,444

[22] Filed: Aug. 11, 1987

[51] Int. Cl.$^4$ .................. C08J 7/02; B01D 39/16; B05D 5/00; B32B 7/02; C08F 6/00

[52] U.S. Cl. .................. 428/398; 210/500.23; 210/500.28; 210/510.1; 210/644; 427/244; 427/255.6; 427/352; 428/315.5; 428/409; 524/59; 524/81; 524/84; 524/94; 524/100; 524/104; 524/167; 524/299; 524/324; 524/341; 524/357; 524/362; 524/370; 524/371; 524/384; 528/483; 528/486; 528/487; 528/492; 528/493; 528/494; 528/495; 528/497; 528/503

[58] Field of Search .................. 210/500.23, 500.28, 210/510.1; 260/707; 427/244, 255.6, 352; 428/398, 409; 524/59, 81, 84, 94, 100, 104, 167, 299, 324, 341, 357, 362, 370, 371, 384; 528/483, 486, 487, 492, 493, 494, 495, 497, 503

[56] References Cited

U.S. PATENT DOCUMENTS 4,118,363 10/1978 Smith .................. 524/371

OTHER PUBLICATIONS

Lovinger et al., J. Appl. Phys., 58(8), Oct. 15, 1985.

Primary Examiner—James C. Cannon

[57] ABSTRACT

The present invention relates to a process for the solvent-induced crystallization of amorphous poly(etheretherketone)-type polymer to produce an article, which process comprises:

A. contacting a preformed article of a polymer comprising amorphous poly(etheretherketone)-type polymer with at least one organic compound in its liquid state which consists essentially of atoms of carbon and hydrogen, optionally with oxygen, nitrogen, sulfur, halogen or mixtures thereof having a molecular weight of between about 160 and 320 daltons at a temperature of between about 85° C. and 145° C. for a time effective to crystallize the poly(etheretherketone)-type polymer, B. removing the organic compound, and C. recovering the article comprising crystallized poly(etheretherketone)-type polymer. Poly(etheretherketone), poly(phenylenesulfide) or mixtures thereof are preferred polymer systems. This process requires a much lower temperature than those necessary to prepare crystallized polymers by thermal annealing procedures. The polymers are useful in dialysis and ultrafiltration. The polymer article having a trace of the organic compound is also described.

20 Claims, No Drawings

PROCESS FOR THE SOLVENT-INDUCED CRYSTALLIZATION OF AMORPHOUS POLY(ETHERETHERKETONE)-TYPE POLYMERS AND THE ARTICLE FORMED THEREBY

BACKGROUND OF THE INVENTION

1. Field of the Invention

The present invention relates to the solvent-induced crystallization of normally solvent-resistant amorphous organic polymers using specific high boiling organic solvents. More specifically, the invention pertains to the solvent-induced crystallization of amorphous poly(etheretherketone) (PEEK)-type polymers, amorphous polymers having similar structures to PEEK, poly(phenylene sulfide) (PPS) or physical mixtures of these amorphous polymers. Because these polymers are difficult to fabricate and usually require very high processing temperatures, the solvent-induced crystallization of the present invention is very useful because it proceeds at relatively lower temperatures, in some cases more than 100° C. lower than those used in normal solvent fabrication.

2. Description of the Related Art

B. J. MacNulty in the *Journal of Materials Science*, Vol. 8, pp. 1495–1504, published in 1973, discusses the effect of solvents and mixed solvents on the formation of crystalline entities in polymers having phenylene groups in the main chain. The polymers include, poly(carbonate), poly(sulfone), poly(phenylene oxide), and phenoxy resin. The solvents include chloroform, methylene chloride, acetone, benzene, xylene, and carbon tetrachloride.

W. Koslowski, et al., in *Polimery (Warsaw)*, Vol. 19, No. 10, pp. 483–487, published in 1974 disclose that amorphous nylon 6 is crystallized by exposure to various hydrophilic liquids or water vapor. [See *Chem. Abstracts*, Vol. 82, 171569q (1975)].

A. B. Desai, et al., in the *Journal of Polymer Science, Polymer Symposium*, Vol. 46, pp. 291–319, (1974), disclose that poly(ethylene terephthalate) is crystallized in the presence various organic solvents.

N. Overbergh et al., in *Polymer*, Vol 16, pp. 703–708, published in 1975 disclose the crystallization of isotactic polystyrene induced by contact with low molecular weight organic compound vapor, such as dichloromethane and acetone.

V. Vittoria et al., in *Macromolecules*, Vol. 19, pp. 1975-79, published in 1986 disclose the solvent-induced crystallization of quenched isotactic polypropylene fibers in a number of low molecular weight organic solvents including n-hexane, octane, cyclohexane, carbon tetrachloride, toluene, benzene, chloroform, chlorobenzene and dichloromethane.

N. J. Tyrer et al., in *Macromolecules*, Vol. 85, p. 511–518, published in 1985, and also in Vol. 84, pp. 2296–2303, published in 1984, disclose the solvent-induced vapor crystallization of isotactic polystyrene using hexahydroindan and cyclooctane.

H. A. Smith in U.S. Pat. No. 4,118,363 discloses the solution of PPS, as a crystalline polymer having a solubility parameter of between 7 and 12.5, using an alkyl or halogen substituted diphenyl ether.

The general chemistry of aromatic polyethers is described by D. M. White and G. D. Copper, in *Kirk-Othmer: Encyclopedia of Chemical Technology*, 3rd ed., Vol 18 pp. 594–615 in 1982, which is incorporated herein by reference.

The general chemistry of the polymer (PPS) is described in H. W. Hill, Jr. and D. G. Brady in "Poly(phenylene sulfide)" published in *Kirk-Othermer: Encyclopedia of Chemical Technology*, 3rd ed. Vol. 18, pp. 793–814, in 1982, which is incorporated herein by reference.

None of these references individually or collectively teach or suggest the present invention of solvent-induced crystallization of normally solvent-resistant polymers, such as PEEK or PPS.

Amorphous PEEK or PPS have not heretofore been subjected to solvent-based crystallization. Because of their high solvent resistance, it is not possible to predict a priori whether or not solvent-induced crystallization will proceed or which solvents are useful for solvent-induced crystallization.

SUMMARY OF THE INVENTION

The present invention relates to a process for the solvent-induced crystallization of amorphous poly(etheretherketone)-type polymers to produce an article, which process comprises:

A. contacting a preformed article of a polymer comprising amorphous poly(etheretherketone)-type polymer with at least one organic compound in its liquid state which consists essentially of atoms of carbon and hydrogen, optionally with oxygen, nitrogen, sulfur, halogen or mixtures thereof having a molecular weight of between about 160 and 320 daltons at a temperature of between about 85° C. and 145° C. for a time effective to crystallize the poly(etheretherketone)-type polymer, B. removing the organic compound, and C. recovering the article comprising crystallized poly(etheretherketone)-type polymer.

In another aspect, the present invention relates to the article of crystallized polymer obtained by the process of solvent-induced crystallization described herein.

DETAILED DESCRIPTION OF THE INVENTION AND PREFERRED EMBODIMENTS

Definitions:

As used herein:

"Poly(etheretherketone)" or "PEEK" refers to a polymeric material which comprises poly(etheretherketone), i.e., [poly(oxy-p-phenyleneoxy-p-phenylenecarbonyl-p-phenylene]. Other similar polymeric (PEEK-like polymers) materials such as poly(aryletherketone) (PAEK), poly(etherketone) (PEK), or poly(etherketoneketone) (PEKK), may also be polymers within this invention. Further, poly(etheretherketone) (PEEEK), poly(etheretherketoneetherketone) (PEEKEK), poly(etheretherketoneketone) (PEEKK), poly(etherketoneetherketoneketone) (PEKEKK) are also to be considered as PEEK-type polymers, both individually and as mixtures or copolymers with each other.

"PEEK-type" refers to poly(etheretherketone)-like polymers, poly(phenylenesulfide)-type polymers or mixtures or copolymers of these amorphous polymers within the present invention.

"Phenyl" or "phenylene" refers to the following structures:

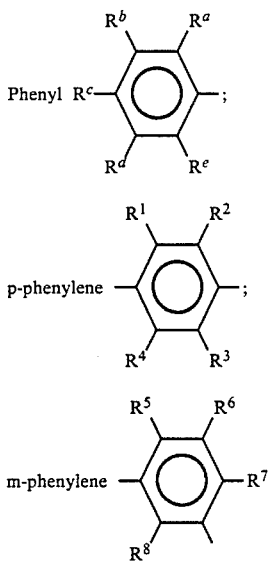

wherein $R^a$, $R^b$, $R^c$, $R^d$, $R^e$ and $R^1$ and $R^8$ are each independently selected from hydrogen, methyl, ethyl, propyl, butyl, fluorine, chlorine or bromine.

These structures may be found as part of the PEEK-like, PEEK-type, PPS, PPS-like, and PPS-type polymer structures described herein. Thus, a poly(phenylene sulfide)-type structure may have as a structure poly(2-chlorophenylene sulfide) or poly (2-methylphenylene sulfide). Also, a PEEK-type structure may include [poly (oxy-p-(2-chlorophenyleneoxy)-p-(2-methylphenylenecarbonyl)-p-phenylene)]. Usually, the p-phenylene is preferred wherein at least two groups of $R^1$ to $R^4$ are hydrogen and the other two groups are each independently selected from methyl, ethyl, propyl, butyl, fluorine, chlorine or bromine. Especially preferred is p-phenylene where three of the groups $R^1$ and $R^4$ are hydrogen and the remaining group is independently selected from methyl, ethyl, propyl, butyl, fluorine, chlorine or bromine.

Amorphous crystallizable polymers are normally crystallized by annealing for various lengths of time at temperatures above their glass transition temperature (Tg). Significant advantages of the present invention are (a) that complete crystallization may be accomplished at considerably lower temperatures below Tg than by thermal annealing, (b) that crystallization may be accomplished in a solid preformed amorphous article; and (c) that the depth and degree of crystallization may be controlled by proper selection of the liquid organic compound, the temperature, and the time of exposure.

The invention comprises a method of crystallizing amorphous solvent resistant high temperature (PEEK)-type polymers, such as poly(etheretherketone), poly(phenylene sulfide) and the like, by immersing the polymer in selected organic compounds above the melting point of the compounds (in the liquid state). The organic compounds, as liquids, must be capable of physically interacting with the amorphous polymer such as PEEK, PPS or the like; i.e., the organic compounds must be able to swell the amorphous polymer, plasticize it, and/or be solvents at elevated temperatures.

The present solvent-induced (sometimes referred to as liquid-induced) crystallization provides a method to permit the amorphous polymer to be crystallized below its glass transition temperature, (Tg). The amorphous polymer may also be crystallized by exposure to the vapors of the liquid organic compound. Contact with the vapors usually results in slower crystallization.

The liquid-induced crystallization is a surface event. Thus, depending upon the intended use, an amorphous polymer object may be surface crystallized having an amorphous interior. Crystallization of amorphous PEEK is preferably conducted at about 115° C., which is about 30° C. below the reported Tg for PEEK of 143°–145° C.

Preferably, the polymer is PEEK, PPS or mixtures thereof.

The contact time of the organic compound(s) and the polymer is generally between about 0.10 and 150 hr, preferably between 1.0 and 150 hr. Preferably, the contact temperature is between about 100° and 120° C., especially about 115° C., and the contact time is between 24 and 100 hrs.

Some specific organic compounds useful in this invention are listed in the Examples.

The present process is effective in solvent crystallizing amorphous PEEK in the form of solid fibers, hollow fibers, flat sheets, films, membranes and the like. Preferably, the article formed is porous, permeable, semipermeable or selectively permeable. Thus, the articles are useful in applications for the separation of solids from liquids by ultrafiltration or dialysis.

The crystallization process appears to be diffusion controlled. The amount rate and degree of solvent-induced crystallization of each polymer depends upon at least the following: the organic compound, the concentration of the organic liquid, the temperature, and the time length of the contact. At least sufficient organic compound in its liquid state must be present to completely cover the surfaces of the initially amorphous article. The presence of excess liquid is not detrimental and is generally preferred. The organic liquid may also include other liquids, compounds, solvents and/or nonsolvents provided that their presence is not detrimental to the crystallizing process.

In some applications, the polymer is crystallized homogeneously throughout the formerly amorphous polymeric article. In other applications, usually when the contact conditions are not long or particularly severe, the crystallized polymer will be present as a thin surface layer on the amorphous article.

The organic compound may be removed partially or completely by conventional techniques such as heating, distillation, reduced pressure, other solvents or a combination of these techniques. Generally, a trace of the solvent(s) described herein will remain in the polymer which can be used to determine and identify at a later time the process used to produce the article having the observed physical properties.

Thus, one embodiment of the present invention is a polymer composition of crystallized poly(etheretherketone) having a trace amount between about (0.02 to 3 percent by weight) of at least one residual organic compound which organic compound consists essentially of atoms of carbon and hydrogen, and optionally atoms selected from oxygen, nitrogen, sulfur, halogen or mixtures of these atoms. The organic compounds found in the Examples are preferred.

It is within the scope of this invention that physical mixtures of amorphous PEEK-type polymers are subject to solvent crystallization as described herein. It is also contemplated that various covalently linked copolymer structures (e.g. block, alternating, random structures) are amorphous and are subject to solvent crystallization as is described herein.

The following Examples are meant to be illustrative only, and are not to be construed to be limiting in any way.

EXAMPLE 1

General Procedure for Solvent-Induced Crystallization of Peek (Bulk)

(a) Amorphous PEEK is prepared by melt extrusion followed by immediate quenching of the extrudate in ice water. The resulting clear strand of fiber is chopped into small pieces and dried at 38°–40° C. under the full vacuum of an oil pump (about 0.1 mm Hg).

About 15–20 of the resulting dried pellets are placed in 1.0 to 1.5 grams of the organic compound (about 11.5–20.6% by weight polymer) in small glass vials sealed in air using an aluminum foil-lined screw cap. A control containing no added organic compound (neat) is prepared for comparison.

The mixtures are heated at 115° C. in an air-circulating oven for between 100 and 117 hours. The mixtures are then cooled to ambient temperature, and the resulting pellets are sliced for microscopic examination.

The control sample showed no crystallization. All five of the organic compounds showed varying degrees of crystallinity. The relative order of effectiveness (i.e., the average percent penetration of the crystalline layer into the pellet/hr at 115° C. is shown in Table 1.

TABLE 1

| Exp. No. | Organic Compound | Relative Order* |
| --- | --- | --- |
| 1-0 | Control-No solvent | 0.00 |
| 1-A | Diphenyl phthalate | (too slow to measure) |
| 1-B | Fluoranthene | 0.15 |
| 1-C | m-Terphenyl | 0.18 |
| 1-D | 1-Cyclohexyl-2-pyrrolidinone | 0.63 |
| 1-E | Benzophenone | 0.68 |

*Average percent penetration of crystalline layer into pellet of amorphous polymer per hour at 115° C.

(b) Similarly, the experiments are repeated as is described in Example 1(a) above, except that amorphous PEEK is replaced with an equivalent amount of amorphous PPS. It is expected that amorphous PPS will become crystalline PPS in a similar manner.

EXAMPLE 2

General Procedure for Solvent-Induced Crystallization of Peek (Hollow Fiber)

(a) Hollow fibers of amorphous PEEK about 1-cm long are heated in organic compound at 115° C. for 94.5 hr. The hollow fibers had a nominal inside diameter of 206.6 microns, and a nominal wall thickness of 45.8 microns prior to treatment with the organic compound. The results are shown in Table 2.

TABLE 2

| Exp. No. | Organic Compound | Result |
| --- | --- | --- |
| 2-0 | Control-No Solvent | No crystallization |
| 2-A | Diphenyl phthalate | — |
| 2-B | Fluoranthene | Complete Crystallization |
| 2-C | m-Terphenyl | Complete Crystallization |
| 2-D | 1-Cyclohexyl-2-pyrrolidinone | Complete Crystallization |
| 2-E | Benzophenone | Complete Crystallization |

(b) Similarly, the experiments are repeated as is described in Example 2(a) except that amorphous PEEK hollow fiber is replaced with an equivalent amount of amorphous PPS hollow fiber. It is expected that amorphous PPS hollow fiber will become crystalline PPS hollow fiber in a similar manner to that described.

EXAMPLE 3

Solvent-Induced Crystallization of Peek (Hollow Fiber)

The amorphous fibers of PEEK of Example 2(a) were immersed in excess 1-phenyl-2-pyrrolidinone in a sealed vial and heated in an aircirculating oven at 101° C. for 118 hours. The fibers were removed from the hot liquid, cooled to ambient temperature, and extracted with acetone with vigorous agitation for 70 minutes. The extracted fibers were dried at ambient temperature in a vacuum oven at less than 0.1 mm Hg pressure for 40 minutes followed by drying overnight at ambient temperature at normal atmosphere pressure. Microscopic examination showed that the fibers were completely crystallized.

EXAMPLE 4

Solvent-Induced Crystallization of Amorphous Peek (a) The solvent-induced crystallization described in Example 1(a) is repeated except that the organic compound, m-terphenyl, is replaced with an equivalent amount (by weight) of 1-benzyl-2-pyrrolidinone, 1-chloronaphthalene, 1-benzoylnaphthalene, 1-benzoylnaphthalene, diphenyl sulfone, 2,5-diphenyl-1,3,4-oxadiazole, 2,6-diphenylphenol, 4,4'-dimethoxybenzophenone, 2,5-diphenyloxazole, diphenyl phthalate, 2-biphenylcarboxylic acid, 4-benzoylbiphenyl, triphenylmethane, 1,2-dibenzoylbenzene, dibenzoylmethane, pentafluorophenol, o,o'-biphenol, dibenzothiophene, phenanthrene, 4-bromodiphenyl ether, 4-bromobiphenyl, 1-benzoyl-4-piperidone, N,N-diphenylformamide, 3-phenoxybenzyl alcohol, 9-fluorenone, benzil, 1-phenylnaphthalene, pyrene or 4,4,1-isopropylidenediphenol. It is expected that solvent crystallization will proceed comparable to that of Example 1(a).

EXAMPLE 5

Solvent-Induced Crystallization of PPS (a) The solvent-induced crystallization described in Example 1(a) is repeated except that the amorphous PEEK is replaced by amorphous PPS, and the organic compound, m-terphenyl, is replaced with an equivalent amount (by weight) of 1-benzyl-2-pyrrolidinone, 1-chloronaphthalene, 1-benzoylnaphthalene, diphenyl sulfone, 2,5-diphenyl-1,3,4-oxadiazole, 2,6-diphenylphenol, 4,4'-dimethoxybenzophenone, 2,5-diphenyloxazole, diphenyl phthalate, 2-biphenylcarboxylic acid, 4-benzoylbiphenyl, triphenylmethane, 1,2-dibenzoylbenzene, dibenzoylmethane, pentafluorophenol, o,o'-biphenol, dibenzothiophene, phenanthrene, 4-bromodiphenyl ether, 4-bromobiphenyl, 1-benzoyl-4-piperidone, N,N-diphenylformamide, 3-phenoxybenzyl alcohol, 9-fluorenone, benzil, 1-phenylnaphthalene, pyrene or 4,4'-isopropylidenediphenol. It is expected that solvent crystallization will proceed comparable to that of Example 1(a).

EXAMPLE 6

Solvent-Induced Crystallization of Peek-Type Polymers (a) The solvent-induced crystallization described in Example 1(a) is repeated except that amorphous PEEK is replaced by amorphous poly(aryletherketone) (PAEK), poly(etherketone) (PEK), poly(etherketoneketone) (PEKK), poly(etheretheretherketone) (PEEEK), poly(etheretherketoneetherketone) (PEEKEK), poly(etheretherketoneketone) (PEEKK), or poly(etherketoneetherketoneketone) PEKEKK) and the organic compound, m-terphenyl, is repeated with an equivalent amount (by weight of 1-benzyl-2-pyrrolidinone, 1-chloronaphthalene, 1-benzoylnaphthalene, diphenyl sulfone, 2,5-diphenyl-1,3,4-oxadiazole, 2,6-diphenylphenol, 4,4'-dimethoxybenzophenone, 2,5-diphenyloxazole, diphenyl phthalate, 2-biphenylcarboxylic acid, 4-benzoylbiphenyl, triphenylmethane, 1,2-dibenzoylbenzene, dibenzoylmethane, pentafluorophenol, o,o'-biphenol, dibenzothiophene, phenanthrene, 4-bromodiphenyl ether, 4-bromobiphenyl, 1-benzoyl-4-piperidone, N,N-diphenylformamide, 3-phenoxybenzyl alcohol, 9-fluorenone, benzil, 1-phenylnaphthalene, pyrene or 4,4'-isopropylidenediphenol. It is expected that solvent crystallization will proceed comparable to that of Example 1(a).

EXAMPLE 7

Solvent-Induced Crystallization of Phenyl Substituted Amorphous Peek-Type Polymers (a) The solvent-induced crystallization described in Example 1(a) is repeated except that the amorphous PEEK is replaced by amorphous poly (2-methylphenylene sulfide) or amorphous poly (2-chlorophenylene sulfide). It is expected that the solvent crystallization of each amorphous polymer will proceed in a manner comparable to that of Example 1(a).

EXAMPLE 8

Solvent-Induced Crystallization of Phenyl Substituted Amorphous Peek-Like Polymers (a) The solvent-induced crystallization described in Example 1(a) is repeated except that the amorphous PEEK is replaced by amorphous PEEK having the "p-phenylenecarbonyl" portion of the polymer replaced by either "p-(2-methylphenylenecarbonyl)" or by "p-(2-chlorophenylenecarbonyl)". It is expected that the crystallization of each substituted p-phenylene polymer will proceed in a manner comparable to that of Example 1(a).

The process of the present invention is conducted usually up to 100° C. lower than normal crystallization of the polymers. PEEK-type and PPS-type polymers are useful in the separation of materials, for instance, as thin membranes in dialysis and ultrafiltration separations.

While some embodiments of the present invention have been shown described herein, it will be apparent to those skilled in the art that various modifications and changes can be made in the solvent crystallization of amorphous solvent-resistant PEEK, PEEK-like, PEEK-type polymers, such as PEEK, PPS or mixtures thereof, without departing from the spirit and scope of the present invention. All such modifications and changes coming within the scope of the appended claims are intended to be covered thereby.

We claim:

1. A process for the solvent-induced crystallization of amorphous poly(etheretherketone)-type polymers to produce an article comprising the solvent-induced crystalline poly(etheretherketone)-type polymer, which process comprises:

A. contacting a preformed article of a polymer comprising amorphous poly(etheretherketone-type polymer with an effective amount of at least one organic compound in its liquid state which organic compound consists essentially of atoms of carbon, hydrogen, oxygen, nitrogen sulfur, halogen or mixtures thereof having a molecular weight of between about 160 and 320 daltons at a temperature below the polymer glass transition temperature Tg wherein the temperature of contact is between about 85° C. and 145° C. for a time effective to first swell and plasticize the amorphous polymer in physical contact with the organic compound and subsequently crystallize the amorphous poly(etheretherketone)-type polymer, without destroying the physical form characteristic of the preformed article prior to contact with said organic compound, B. removing the organic compound under conditions effective to maintain the solvent-induced crystalline polymer in the preformed article form, and C. recovering the preformed article comprising solventinduced crystalline poly(etheretherketone)-type polymer.

2. The process of claim 1 wherein the poly(etheretherketone)-type polymer is selected from poly(etheretherketone) (PEEK), poly(etherketone) (PEK), poly(aryletherketone) (PAEK), poly(phenylene sulfide) (PPS), poly(etherketoneketone) (PEKK), poly(etheretheretherketone) (PEEEK), poly(etheretherketoneetherketone) (PEEKEK), poly(etheretherketoneketone) (PEEKK), poly(etherketoneetherketoneketone) (PEKEKK), or mixtures or copolymers thereof.

3. The process of claim 1 wherein the polymer comprises poly(etheretherketone) or a phenylene substituted poly (etheretherketone).

4. The process of claim 1 wherein the polymer comprises poly(phenylenesulfide) or a phenylene substituted poly (phenylenesulfide).

5. The process of claim 1 wherein in Step (A) the contact time is between about 0.10 and 150 hours.

6. The process of claim 1 wherein in Step (A) the temperature is about 115° C., and the time is between 24 and 100 hours.

7. The process of claim 1 wherein in Step (A) the at least one organic compound is selected from fluoranthene, m-terphenyl, o-terphenyl, benzophenone, 1-cyclohexyl-2-pyrrolidinone, 1-benzyl-2-pyrrolidinone, 1-phenyl-2-pyrrolidinone, 1-chloronaphthalene, 2-benzoylnaphthalene, diphenyl sulfone, 2,5-diphenyl-1,3,4-oxadiazole, 2,6-diphenylphenol, 4,4'-dimethoxybenzophenone, 2,5-diphenyloxazole, diphenyl phthalate, 2-biphenylcarboxylic acid, 4-benzoylbiphenyl, triphenylmethane, 1,2-dibenzoylbenzene, dibenzoylmethane, pentafluorophenol, o,o'-biphenol, dibenzothiophene, phenanthrene, 4-bromodiphenyl ether, 4-bromobiphenyl, 1-benzoyl-4-piperidone, N,N-diphenylformamide, 3-phenoxybenzyl alcohol, 9-fluorenone, benzil, 1-phenylnaphthalene, pyrene, 4,4'-isopropylidenediphenol, or mixtures thereof.

8. The process of claim 1 wherein the at least one organic compound is selected from fluoranthene, m-terphenyl, 1-cyclohexyl-2-pyrrolidinone, benzophenone or mixtures thereof.

9. The process of claim 1 wherein the time is between about 12 and 100 hrs and the temperature is between about 105° and 130° C.

10. The process of claim 9 wherein the poly(etheretherketone)-type polymer is selected from poly(etheretherketone), poly(phenylenesulfide) or mixtures thereof, and the at least one organic compound is selected from fluoranthene, m-terphenyl, 1-cyclohexyl-2-pyrrolidinone, benzophenone or mixtures thereof.

11. The article produced by the process of claim 1.

12. The article produced by the process of claim 11 wherein said article is selected from a film, membrane, sheet, solid or hollow fiber.

13. The article of claim 12 wherein said article is porous permeable, semi-permeable or selectively permeable.

14. The article of claim 11 wherein the crystalline polymer is present homogenously throughout said article.

15. The article of claim 11 wherein the crystalline polymer is present as a thin layer on the surfaces of said article.

16. An article produced by the process of claim 1 comprising a polymer composition consisting essentially of crystallized poly(etheretherketone)-type polymer and a trace amount of the at least one residual organic compound used in solvent-induced crystallization which organic compound itself consists essentially of atoms of carbon, hydrogen, oxygen, nitrogen, sulfur, halogen or mixtures thereof having a molecular weight of between about 160 and 320 daltons and the organic compound is a liquid between about 85° and 145° C.

17. The polymer composition of claim 16 wherein the at least one residual organic compound is selected from fluoranthene, m-terphenyl, o-terphenyl, benzophenone, 1-cyclohexyl-2-pyrrolidinone, 1-benzyl-2-pyrrolidinone, 1-phenyl-2-pyrrolidinone, 1-chloronaphthalene, 2-benzoylnaphthalene, diphenyl sulfone, 2,5-diphenyl-1,3,4-oxadiazole, 2,6-diphenylphenol, 4,4'-dimethoxybenzophenone, 2,5-diphenyloxazole, diphenyl phthalate, 2-biphenylcarboxylic acid, 4-benzoylbiphenyl, triphenylmethane, 1,2-dibenzoylbenzene, dibenzoylmethane, pentafluorophenol, o,o'-biphenol, dibenzothiophene, phenanthrene, 4-bromodiphenyl ether, 4-bromobiphenyl, 1-benzoyl-4-piperidone, N,N-diphenylformamide, 3-phenoxybenzyl alcohol, 9-fluorenone, benzil, 1-phenylnaphthalene, pyrene, 4,4'-isopropylidenediphenol, or mixtures thereof.

18. The polymer composition of claim 17 wherein the poly(etheretherketone)-type polymer is selected from poly(etheretherketone), poly(phenylenesulfide) or mixtures thereof.

19. The polymer composition of claim 18 wherein the poly(etheretherketone)-type polymer is poly(etheretherketone).

20. The polymer composition of claim 18 wherein the poly(etheretherketone)-type polymer is poly(phenylenesulfide).

* * * * *

UNITED STATES PATENT AND TRADEMARK OFFICE
CERTIFICATE OF CORRECTION

PATENT NO. : 4,897,307

DATED : January 30, 1990

INVENTOR(S) : Henry N. Beck; Robert M. Nowak

It is certified that error appears in the above-identified patent and that said Letters Patent is hereby corrected as shown below:

Col. 2, line 5, "Kirk-Othmer" has been misspelled;

Col. 2, lines 50-52, delete "[poly(oxy-p-phenyleneoxy-p-phenylenecarbonyl-p--phenylene]" and insert -- [poly(oxy-p-phenyleneoxy-p-phenylenecarbonyl-p--phenylene] --;

Col. 6, lines 43-44, delete "1-benzoylnaphthalene,";

Col. 7, line 22, delete "repeated" and insert -- replaced --;

Col. 7, line 23, after "weight" insert -- ) --;

Col. 8, lines 38-39, "solvent-induced" has been misspelled.

Signed and Sealed this

Second Day of April, 1991

Attest:

HARRY F. MANBECK, JR.

Attesting Officer

Commissioner of Patents and Trademarks